US007758081B2

(12) United States Patent
Prater

(10) Patent No.: US 7,758,081 B2
(45) Date of Patent: Jul. 20, 2010

(54) COMPOSITE DOCUMENT FOR BEARING SECURE INFORMATION, APPARATUS AND METHODS FOR PRODUCING SUCH DOCUMENT

(75) Inventor: Peter John Prater, Bristol (GB)

(73) Assignee: QTAC Solutions Ltd., Bristol (GB)

( * ) Notice: Subject to any disclaimer, the term of this patent is extended or adjusted under 35 U.S.C. 154(b) by 0 days.

(21) Appl. No.: 11/847,486

(22) Filed: Aug. 30, 2007

(65) Prior Publication Data

US 2007/0290500 A1 Dec. 20, 2007

Related U.S. Application Data

(62) Division of application No. 10/470,910, filed as application No. PCT/GB02/00400 on Jan. 30, 2002.

(30) Foreign Application Priority Data

Jan. 31, 2001 (GB) ................................ 0102414.0
Feb. 6, 2001 (GB) ................................ 0102917.2
Apr. 27, 2001 (GB) ................................ 0110332.4

(51) Int. Cl.
*B42D 15/00* (2006.01)
*B42D 15/10* (2006.01)
*B65D 65/28* (2006.01)
*G09F 3/00* (2006.01)
*B32B 7/06* (2006.01)
*B32B 7/10* (2006.01)

(52) U.S. Cl. ........................... 283/103; 283/72; 283/99; 283/100; 283/101; 283/104; 283/105; 283/117; 283/901; 283/94; 283/98; 428/43; 428/200

(58) Field of Classification Search .................. 229/71, 229/92.1, 92.3, 92.8; 283/74, 103, 109, 72, 283/94, 98, 99, 100, 101, 104, 105, 117, 283/901; 428/43, 200; *B42D 15/08*
See application file for complete search history.

(56) References Cited

U.S. PATENT DOCUMENTS

| | | | | | |
|---|---|---|---|---|---|
| 1,511,948 | A | * | 10/1924 | Coleman | 229/300 |
| 1,985,592 | A | * | 12/1934 | Woodward | 229/70 |
| 2,076,343 | A | * | 4/1937 | Humphner | 156/177 |
| 4,149,288 | A | | 4/1979 | Sendor et al. | |
| 5,346,123 | A | | 9/1994 | Lombardo | |
| 5,419,590 | A | * | 5/1995 | Rothschild | 283/79 |
| 5,941,048 | A | | 8/1999 | Spitler | |
| 5,989,382 | A | | 11/1999 | Parker | |
| 6,155,476 | A | * | 12/2000 | Fabel | 229/92.3 |

FOREIGN PATENT DOCUMENTS

| | | |
|---|---|---|
| EP | 0201960 | 11/1986 |
| GB | 2238016 | 5/1991 |

* cited by examiner

*Primary Examiner*—Dana Ross
*Assistant Examiner*—Justin V Lewis
(74) *Attorney, Agent, or Firm*—Gifford, Krass, Sprinkle, Anderson & Citkowski, P.C.

(57) ABSTRACT

A method of preparing documents for the transmission of secure information comprises the steps of preparing a first laminar element (13; 37) with a peripheral region (15) separable from a central region (14), printing the secure information on the central region (14) of the first laminar element (13; 37), or on a central region (19) of a second laminar element (12; 36), positioning the two laminar elements (13; 37, 12; 36) in face-to-face relation, with the face of the element bearing the information facing the said other element, and securing the element together around the peripheral regions. Apparatus for preparing secure composite documents comprises a first storage container (25; 47) for the first laminar element (13; 37), a second container (24; 50) for the said second laminar element (12; 36), and means (27, 28, 48, 49) for bringing the first and second laminar elements together in face-to-face relationship after the secure information has been printed on one of them, with the face of the laminar element bearing the printed information facing the other laminar element; and means (51; 48, 49) for securing the two laminar elements together around their peripheral regions.

4 Claims, 6 Drawing Sheets

COMPOSITE DOCUMENT FOR BEARING SECURE INFORMATION, APPARATUS AND METHODS FOR PRODUCING SUCH DOCUMENT

CROSS-REFERENCE TO RELATED APPLICATIONS

This application is a divisional of U.S. patent application Ser. No. 10/470,910 filed Jul. 31, 2003, which is a 371 of PCT/GB/02/00400 filed Jan. 30, 2002, which claims priority of United Kingdom Patent Applications 0102414.0 filed Jan. 31, 2001; 0102917.2 filed Feb. 6, 2001; and 0110332.4 filed Apr. 27, 2001.

FIELD OF THE INVENTION

The present invention relates generally to a composite document for bearing secure information and also to apparatus for producing such a composite document and a method for preparing such a composite document.

BACKGROUND OF THE INVENTION

There are many circumstances in which it is desirable or necessary to be able to transmit information in documentary form in a secure manner such that the information can be seen only by the intended recipient. The need for such security arises not only from a social and personal perspective, for example in the transmission of payment details on payslips and the like, but also for more serious reasons for the prevention of criminal activity in the transmission of personal information numbers (PIN numbers) associated with credit cards and other such information.

A primary consideration in the production of documents bearing such information is that the information must be applied to the document in such a way that no other person, not even the person operating the machinery by which the information is applied to the document, can gain access to it.

Prior art attempts to produce satisfactory such documents have included preliminarily closed envelopes bearing, on their inside faces, micro-encapsulated ink particles which, when struck by an impact instrument, rupture and release the ink. In order to apply the information to the document it is, however, necessary to have a so-called impact printer (dot-matrix, daisy wheel or the like) by which the individual letters or numerals of the information can be impressed onto the document in order to cause rupture of the micro-encapsulated ink particles. In order to prevent the information inside the envelope from being viewed from the outside, one face of the document is provided with obscuration printing in the form of swirls and curlicues in an irregular pattern such as to provide a background against which the printed information cannot be distinguished.

However, the majority of establishments currently utilise printing equipment other than impact printers, for example laser printers and bubble jet printers which cannot utilise microencapsulated ink materials since they need an impact to rupture them. One attempt at producing a document for secure information which can be printed utilising a laser, ink jet or bubble jet printer comprises a single sheet of material which, after printing, can be folded and secured by adhesive at the periphery to enclose the sensitive information within it in the manner of an envelope. However, this has the disadvantage that it requires a folding machine. Such machines are expensive and unreliable and require constant supervision to ensure that the folding operation is performed properly.

SUMMARY OF THE INVENTION

The present invention seeks to provide a document for bearing confidential information which overcomes the disadvantages of the prior art, providing a document which can printed with any form of printer, especially a laser, ink jet or bubble jet (non-impact) printer (although, of course, impact printers can be used if they are available) and which does not require folding to conceal the information once it has been applied to the document.

According to one aspect of the present invention, therefore, a composite document for bearing secure information comprises a first laminar element having a central region and a peripheral region separable therefrom, a second laminar element of substantially the same perimetral dimensions as the first, and means for securing the second laminar element to the first in a substantially inseparable manner at the said peripheral region of the said first laminar element.

Preferably the second laminar element also has a peripheral region separable from a central region thereof, and in a preferred embodiment the peripheral regions are defined from the central regions by a line of perforations between the peripheral region and the central region of the first and/or second laminar element.

Confidential information can then be applied to one or other of the laminar elements on that face which, when the two elements are placed face-to-face, is facing the other element in order to be concealed when the composite document is formed by securing the peripheral regions of the first and second laminar elements together.

Of course, information, such as address information, may be applied to a face of one or other of the two laminar elements which is on the outside when the two laminar elements are placed together.

The means for securing the peripheral region of the said first laminar element to the second laminar element preferably comprises an adhesive. Alternatively, of course, other securing means, including the use of fixing elements may be utilised if appropriate.

In embodiments in which the elements are held together by adhesive it is possible for one of a number of different types of adhesive arrangement to be used. For example, a pressure-sensitive adhesive may be applied to only one of the said laminar elements of the document, the two elements lying merely face-to-face until a suitable pressure is applied to cause bonding. The adhesive could in another embodiment be temperature-sensitive adhesive which is substantially non-adhesive at room temperature or may be an adhesive which is rendered tacky and/or cured by irradiation with ultrasound. Alternatively, the adhesive may be a two-part adhesive, one part of which is applied to each of the two laminar elements of the document respectively.

Thus, when each of the laminar elements is being handled prior to being placed in the face-to-face operative relationship with one another, the adhesive material does not cause bonding to other surfaces which might cause difficulty in handling the elements. Once the two elements are placed in their operational relationship, however, the adhesive is caused to bond, either by contact with the co-operating part of the two-part adhesive on the other element, or by the application of bonding pressure. This means that the sheet to be printed either has no adhesive (which is preferred) or the adhesive is one which only reacts to a co-operating component but does not exhibit any adhesive effect on its own when in contact with other surfaces.

At least one laminar element may be printed or otherwise marked with a pattern of obscuration markings on a face thereof other than that intended to bear the said information. These obscuration markings may be on the 'inside' face of the other laminar element such that the "outside" faces can be left blank or carry address information or other publicly available information.

According to another aspect of the present invention, there is provided apparatus for preparing secure composite documents as defined hereinabove, comprising a first storage compartment or tray for the said first laminar element of the composite document, a second storage compartment or tray for the said second laminar element of the composite document, and means for bringing together a said first laminar element and a said second laminar element in face-to-face relationship with one face of the one laminar element bearing printed information facing the other laminar element, and means for securing the said two laminar elements together around the peripheral regions thereof.

In apparatus of the invention the said means for securing the said two laminar elements together around the periphery thereof may include means for applying an adhesive to the peripheral region of at least one of the said two laminar elements. Such means may be located in advance of the printer or downstream of the printer in relation to the path of movement of the laminar elements in the formation of a composite document depending on the nature of the adhesive. For example, if the adhesive is a heat curing or temperature sensitive or it would be affected by the fuser of a laser printer and therefore cannot be applied to the element which is to bear the printed information before it is printed. The adhesive may, of course, be applied to the element after printing, or may be applied only to the other element, with heat being applied subsequently to join the two elements together.

The said means for securing the said two laminar elements together may also include or comprise roller means for pressing together the peripheral regions of the said two laminar elements as they pass there through. This may be associated with heating means if a temperature sensitive adhesive is used.

According to another aspect of the present invention, there is provided a method of preparing documents for the transmission of secure information, comprising the steps of: preparing a first laminar element with a peripheral region separable from a central region, providing the said central region of the first laminar element or a central region of a second laminar element with the said information, positioning the said two laminar elements in face-to-face relation with the face of the element bearing the information facing the other said element, and securing the elements around the said peripheral region thereof.

The method of the invention may be performed in such a way that the step of securing the elements together is performed by providing an adhesive on the peripheral region of one or both of the said elements and contacting the said peripheral regions together to cause the two elements to adhere to one another around the said peripheral region. In performing the method of the invention the step of applying adhesive to the peripheral region to one or both of the said laminar elements may be performed before the application of the said information and steps may be taken to prevent adhesion of the said peripheral region to any other surface which may come into contact with the element until it is brought into contact with the co-operating face of the other said laminar element.

The adhesion of the peripheral region of the said one laminar element may, for example, be prevented until it is brought into contact with the peripheral region of the said other laminar element by the provision of a releasable protective layer over the adhesive at least in the peripheral region of the said one laminar element. Such a layer may, of course, be applied over the entire surface of the laminar element even though it is strictly not necessary other than in the peripheral region, since it facilitates removal of such a release layer if it is in a substantially continuous sheet-like form rather than in a frame-shape form which would be required to cover only the peripheral region of the laminar element.

The adhesion of the peripheral region of the said one laminar element may alternatively be prevented by use of an adhesive material which does not exhibit adhesive properties until activated by irradiation with ultrasound. In this case the elements may be collected in face-to-face relationship in preparation for irradiation since this may take longer than it takes for the element to pass an irradiation station. By utilising a batch process this additional time can be accommodated.

BRIEF DESCRIPTION OF THE DRAWINGS

The embodiments of the present invention will now be more particularly described, by way of example, with reference to the accompanying drawings, in which.

DETAILED DESCRIPTION OF THE PREFERRED EMBODIMENTS

Figure 1:
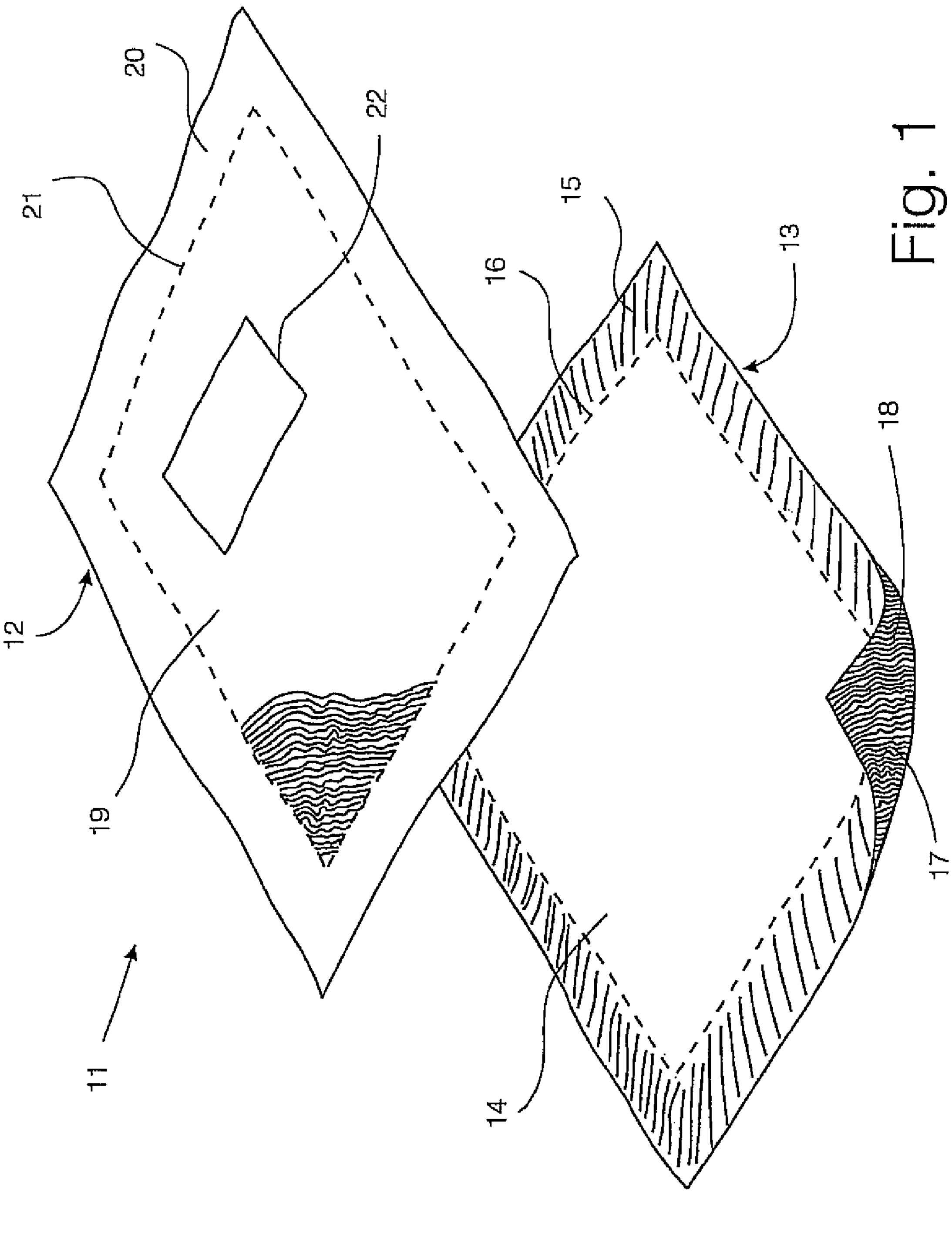
FIG. 1 is a schematic perspective view of a composite document formed as a first embodiment of the present invention.

Referring first to FIG. 1 there is shown a composite document generally indicated 11, comprising a first or upper laminar element generally indicated 12 and second or lower laminar element generally indicated 13. The lower laminar element, which may be considered comparable to the said first laminar element as discussed hereinabove, comprises a generally rectangular sheet of material capable of receiving an image by any conventional printing technique in a central region 14 thereof, as illustrated schematically in FIG. 1, and having a peripheral region 15 around the outside of the central region 14 divided therefrom by a closed perforation line 16. The peripheral region 15 runs parallel to each of the edges of the laminar element 13, approximately equidistant therefrom. On the reverse face 17 of the laminar element 13 there is formed an obscuration image 18 by a printing of closely spaced curved intersecting and overlapping lines such that the information printed on the central region 14 of the upper face of the laminar element 13 cannot be discerned from the other side, even if the laminar element is held up to the light such that shadows of the printed image could be seen through the thickness of the material, as the obscuration printing completely conceals the letters or numbers of the printed information.

The upper or first laminar element 12 likewise has a central region 19 and a peripheral region 20 demarcated by a line 21 of perforations through the material of the element 12 and in a position corresponding approximately to that of the line 16 of perforations in the lower or first laminar element 13. In this embodiment the upper element has a window 22 through which address information printed on the lower element 12 may be seen. In other embodiments (not shown) instead of a window, this area may be solid and provided with the address information so that there are no openings in the upper element 13. This offers greater security for the information but means that both sheets have to be printed. In either embodiment the reverse face of the element 12 may also be printed with obscuration markings (not shown) so that the printed information on the inside cannot be read by shining a light through the document.

Around the peripheral region 15 of the second or lower element 13 and the under surface of the peripheral region 20 of the upper or first laminar element 12 is provided a layer of adhesive the nature of which is such that it has little or no adhesive effect on its own, but which bonds firmly to the corresponding material on the other element.

When two such laminar elements are brought into face-to-face relationship with the adhesive peripheral portions in register they can be secured firmly and permanently together against separation. The nature of the adhesive on the peripheral portions 15 and 20 is such that, once an adhesive bond is made, it cannot be separated without destroying the underlying substrate of the laminar element itself. In use, therefore, confidential information such as a personal identification number or salary details for a payslip, can be printed on the central region 14 of the second or lower laminar element 13 and after this, the information can be completely concealed by overlying the laminar element 13 with the first or upper laminar element 12 with the address information of the intended recipient visible through the window 22.

In another embodiment, not shown, a one-part adhesive is used. This is applied to one of the laminar elements, namely the one which does not bear the printed information. The other element can then be printed without requiring any special arrangements to avoid adhesion problems. Once printed the sheet can be brought into contact with a co-operating sheet bearing adhesive in its perimetral region. Handling of the cooperating sheet is facilitated because it does not have to pass through the printer.

Figure 2:
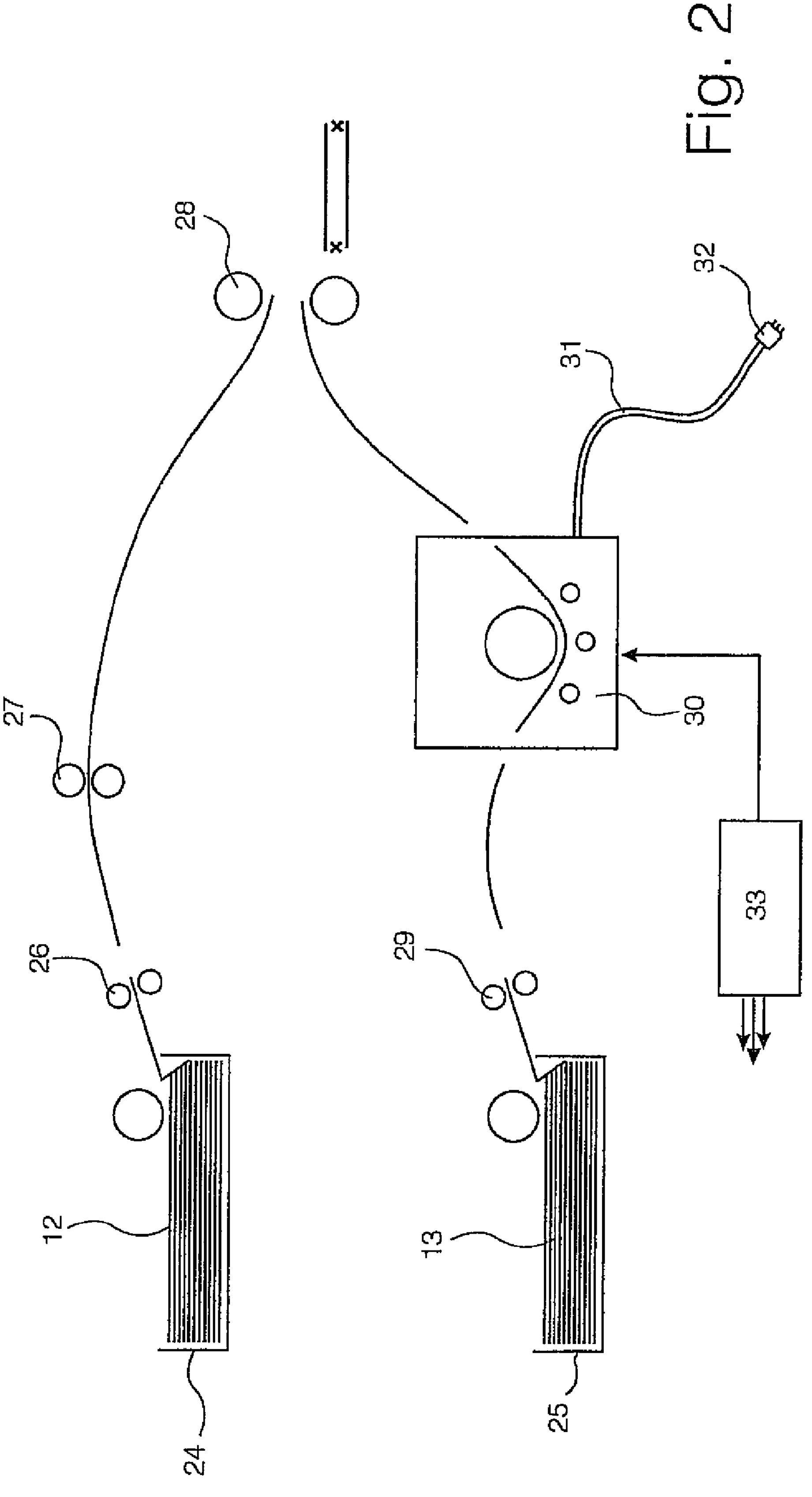
FIG. 2 is a schematic side view of apparatus for preparing a composite document in accordance with the present invention.

FIG. 2 illustrates the main components of a device for assembling laminar elements to form a composite document in accordance with the present invention. The casing of the apparatus is not shown. Within the casing are an upper tray 24 for receiving a stack of upper laminar elements 12, and a lower tray 25 for receiving a stack of lower laminar elements 13.

The upper tray 24 has exit rolls 26 directing laminar elements taken therefrom to a path comprising guiding rolls 27 and combining rolls 28 at which the laminar elements 12 and 13 are combined by passing through the nip between the rolls themselves.

The lower tray 25 has exit rolls 29 guiding laminar elements 13 drawn therefrom to a laser printer 30 which may be of substantially conventional type, receiving input information on a cable 31 from a computer (not shown) connected to the terminal 32. Upon exit from the laser printer 30 laminar elements 13 are combined with laminar elements 12 by passing through the nip between the pressure rolls 28 as mentioned above. Appropriate commands for operating the rolls 26, 27, 28 and 29 are generated from an electronic central control unit 33 which also commands operation of the laser printer 30 although the connections from the ECU 33 to the motors (not shown) driving the rolls 26, 27, 28 and 29 are not shown in detail.

Figure 3:
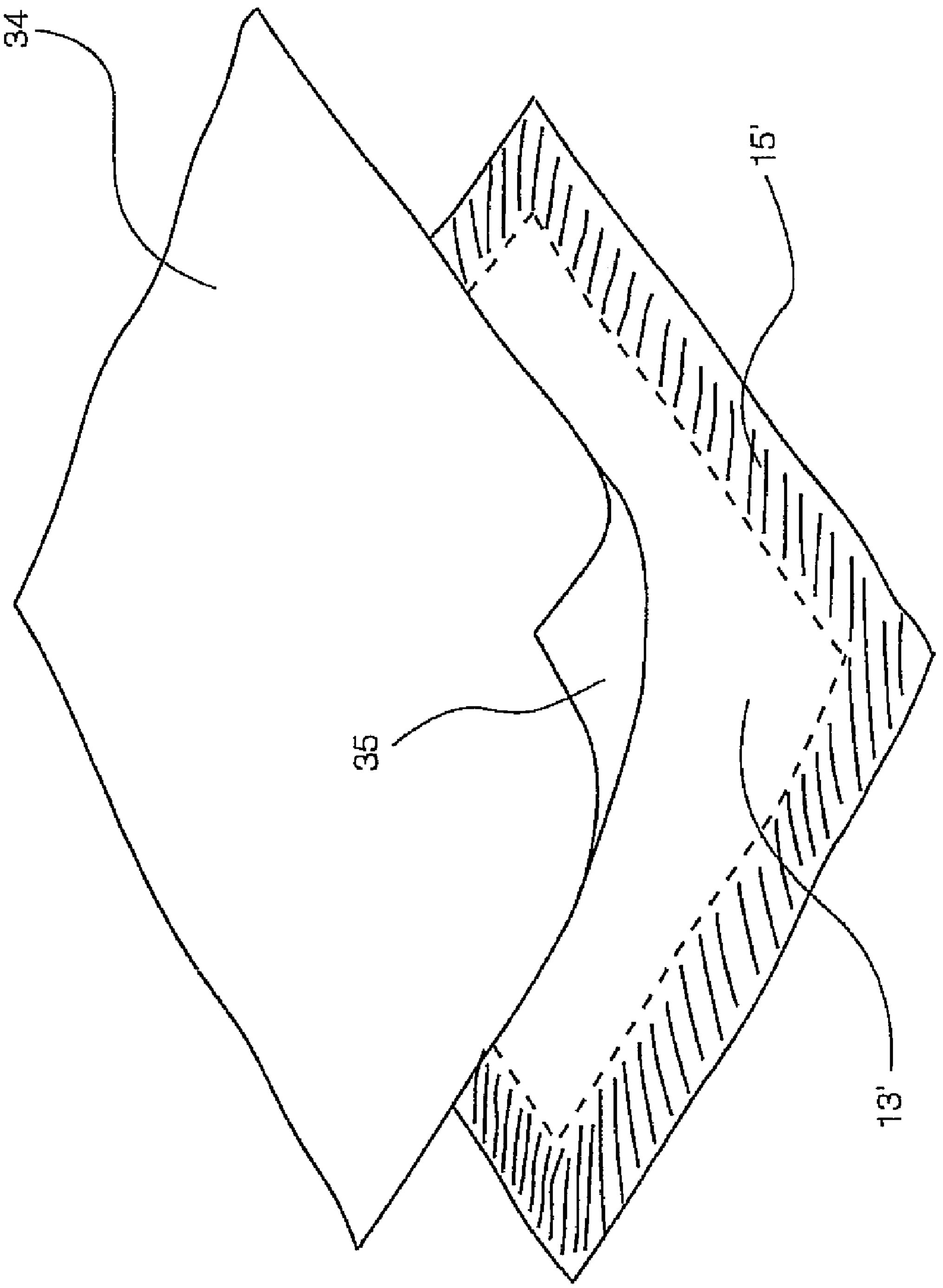
FIG. 3 is a schematic perspective view of an alternative embodiment of the invention.

A machine operating in this way utilises laminar elements formed as in the embodiment of FIG. 1, with a two-part adhesive which has little or no adhesive effect when contacted, for example by corresponding laminar elements of the same type, or when passing through the rolls guiding its passage to or from the printer 30, or indeed from the printer itself. An alternative embodiment is illustrated in FIG. 3, which shows a lower element 13' having a peripheral region similar to that of the embodiment of FIG. 1, but in this case coated with an adhesive having a high "grip" which, in order to prevent unwanted attachment to surfaces other than that intended for formation of a composite document, is covered by release layer 34 the under surface 35 of which is coated with a silicone material allowing it to be placed over the adhesive 15' without forming a bond thereto, and to be pulled off immediately prior to contact with the co-operating laminar element 12 in order to form a composite document in the manner described to hereinabove.

As a further alternative the present invention may be put into practice by first printing a batch of documents such as the laminar elements 13, and then placing them in a tray and joining them together using a simple machine having two storage trays and a pair of combining rollers such as the rollers 28. Embodiments in which the central region 22 of the upper sheets 12 is formed as a window are preferred for this arrangement in order to ensure that the secure information and the address information are always properly matched. Alternatively, of course, the address information may be printed on the reverse face of sheets 13 so that the upper elements 12 serve only as covering elements. Upon arrival at their intended destination the documents can be opened by tearing off the peripheral region to separate the upper and lower elements 12, 13.

Figure 4:
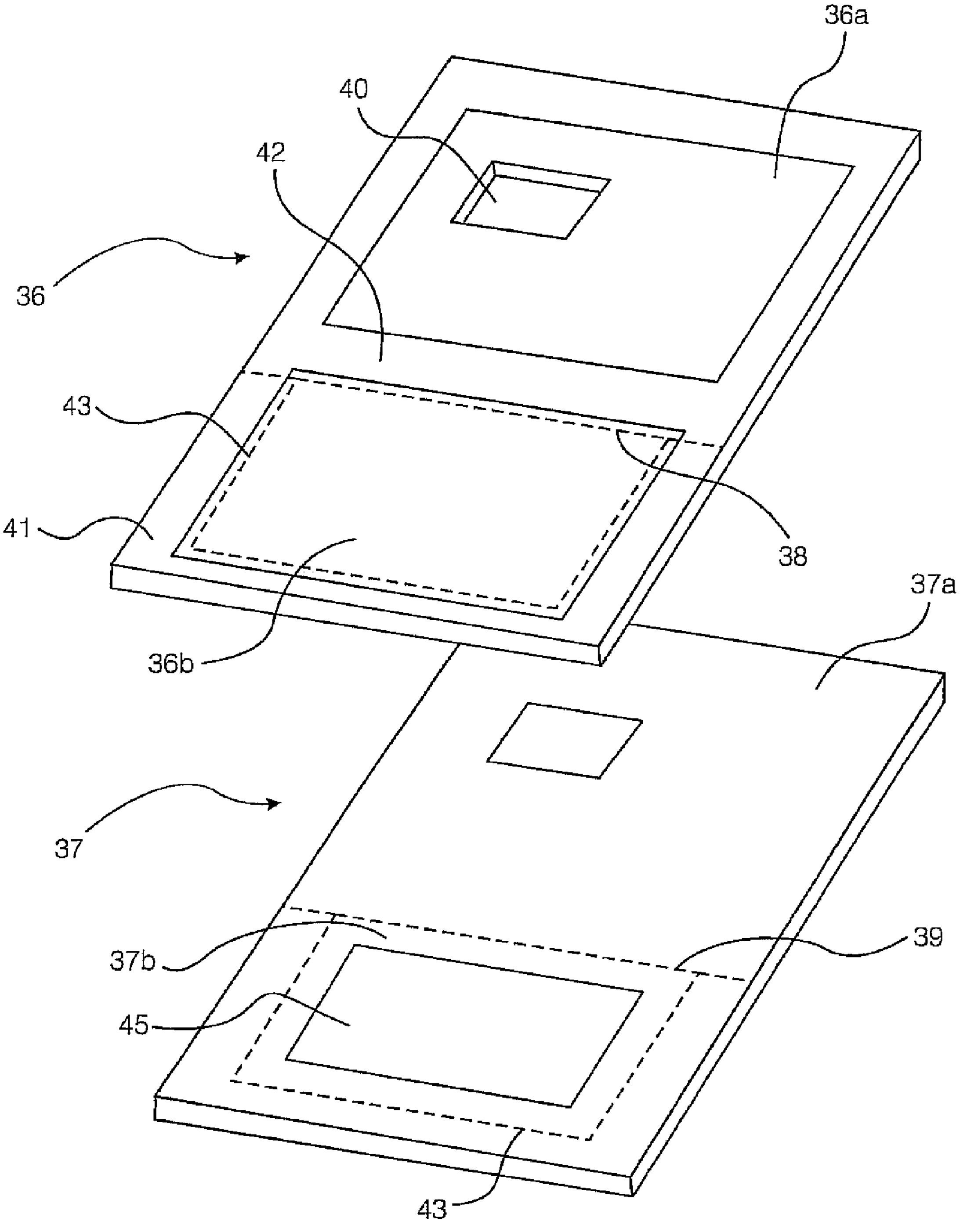
FIG. 4 is a schematic perspective view of a further alternative embodiment of the invention using a temperature sensitive adhesive.

FIG. 4 shows two co-operating laminar elements 36, 37 having respective upper and lower regions separated by respective transverse perforation lines 38, 39 into first and second regions, respectively 36*a*, 36*b* and 37*a*, 37*b*. The laminar element 36 has an address window 40 in the first region 36*a*.

On one face of the laminar elements 36 there is a layer of heat-sensitive adhesive 41 extending entirely around the peripheral region of the element 36. A strip of adhesive 42 also extends transversely across the element 36 from side to side alongside the perforation line 38 between the portions 36*a* and 36*b*. A peripheral perforation line 43 runs parallel to the edges of the laminar element 36*b* just inside the peripheral adhesive layer 41.

The other laminar element 37 also has a peripheral perforation line 43' located in substantially the same position in relation to the edges of the portion 37*b* of the element 37 as the perforation line 43 occupies in relation to the edges of the portion 36*b* of the laminar element 36. The first portion 37*a* of the laminar element 37 has an address panel 44 which is located in relation to the edges of the panel 37 in the same location as the address window 40 in relation to the edges of the panel 36 so that when the two laminar elements 36, 37 are superimposed over one another the address panel 44 is visible through the address window 40. The second portion 37*b* of the laminar element 37 has a region 45 for receiving the secure information. No adhesive is applied to the element 37, however, and, apart from the perforation lines 39, 43' it has no distinguishing physical features from a plain sheet. It may, of course, be marked with indicia showing the regions 44 and 45 although this is not essential and such regions may be no more than nominal areas within the laminar element 37 for reception of printed information. This laminar element can therefore be passed through a laser printer to receive both the address information and the secure information without there being any risk of error or incorrect association of the address information with the secure information since this can be printed at the same time as the secure information. After printing, a laminar element 36 is then superimposed over the laminar element 37 and the two joined by activation of the heat sensitive adhesive strips 41 and 42. The adhesive strip 42 ensures that the address panel 44 is entirely surrounded by adhesive so that the composite document formed by juxtaposition and union of the two elements 36, 37 is totally secure in the sense that the front panel 36 cannot be lifted by inserting a finger under the edge of the address window 40 to allow an observer to gain access to the secure information in the region 37*b*. This avoids the necessity for provision of a transparent panel over the window 40 although such panel may be utilised if desired. Alternatively, of course, the address could be printed on the opposite face of element 37, in which case element 36 would not need an address window.

Figure 5:
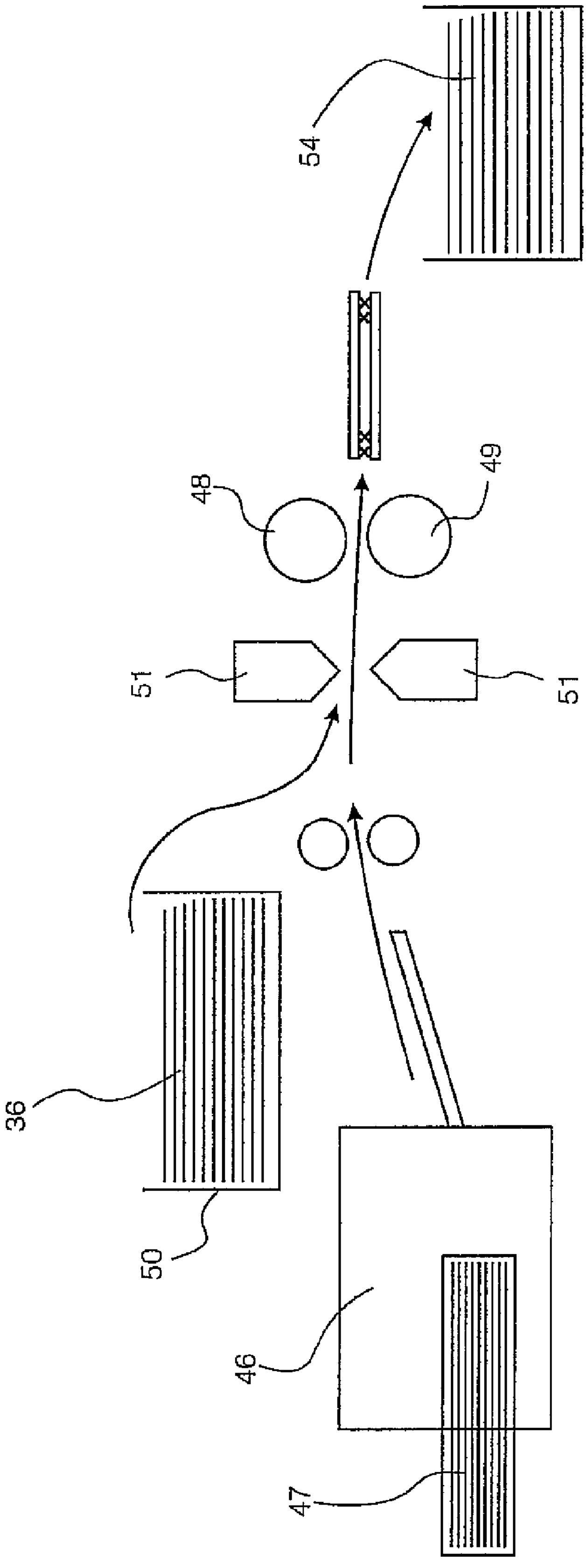
FIG. 5 is a schematic side view of apparatus for performing the method of the invention using laminar elements having a heat-sensitive adhesive.

FIG. 5 illustrates the configuration of apparatus suitable for printing and assembling secure documents in accordance with the invention. A laser printer 46 has a magazine 47 bearing a stack of elements 37 for printing with address and secure information in the respective regions 44, 45. The output from the laser printer 46 is then fed on a path towards two pressure rollers 48, 49. Simultaneously elements 36 from a stack in a magazine 50 are fed towards the rollers 48,49 so that the two overlie one another. Just in advance of the rollers 48, 49 is a heater 51 having upper and lower heating elements which radiate heat onto the two laminar elements as they pass so that the adhesive on the upper laminar element 36 is caused to become tacky or otherwise exhibit its adhesive properties so that, as the two elements pass through the rollers 48, 49 they are securely bonded to form a composite document 53. The documents 53 are then stored in a tray 54 for subsequent dispatch to their addresses.

Figure 6:
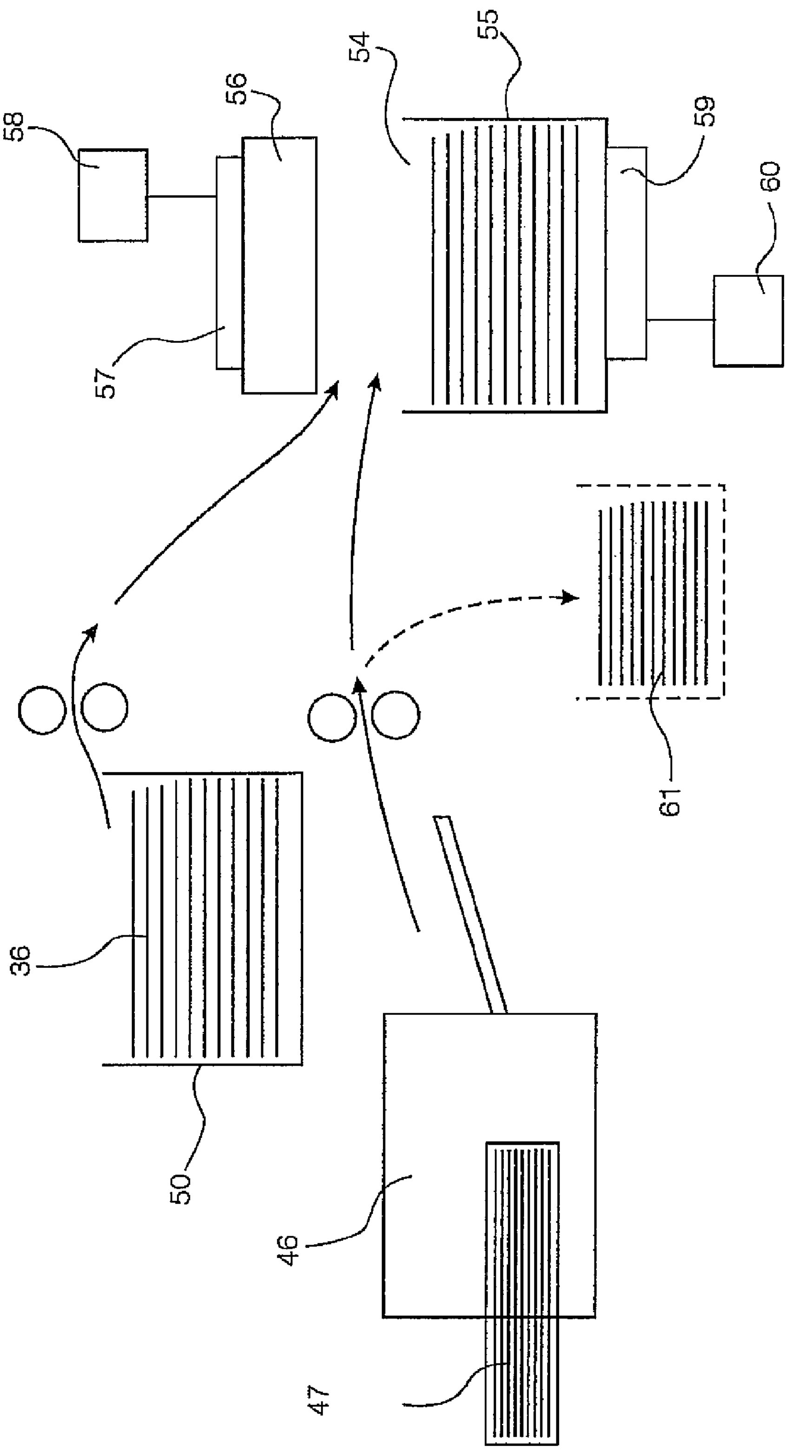
FIG. 6 is a schematic side view of apparatus for performing the method of the invention using adhesive cured ultrasonically.

FIG. 6 illustrates apparatus for batch curing composite documents assembled from elements similar to those illustrated in FIG. 4, but in which the adhesive is not one sensitive to temperature, but rather exhibits its adhesive properties in response to irradiation with ultrasound. Here, the laser printer 46 and magazine 50 are similar to those illustrated in FIG. 5. However, after they have been assembled each pair of elements 36, 37 is then passed to a press to form a stack of composite documents 54 which, when sufficient documents have been assembled, receives an upper platen 56 bearing an ultrasonic transducer 57 energised by a suitable generator 58 shown schematically in FIG. 6. A further ultrasonic transducer 59 may be positioned at the lower face of the press 55, driven by a separate generator 60. The platen 56 applies a light pressure to the documents 54 in the stack to ensure that they are all pressed together when the ultrasonic radiation is generated to cure the adhesive. Since ultrasonically cured adhesive may take a few minutes to develop its adhesive properties this allows the printer 46 to continue printing a further batch of documents, represented schematically by the stack 61 for subsequent transfer into the press 55 once the curing operation is complete and the documents 54 removed.

The invention claimed is:

1. A method of preparing documents for the transmission of secure information, characterised in that it comprises the steps of: providing a first laminar element with a peripheral region separable from a central region, providing a second laminar element with a peripheral region separable from a central region, said second laminar element initially being physically separate from said first laminar element, providing one of said central region of the first laminar element and said central region of a second laminar element with the said secure information, providing an adhesive only on the peripheral region of only one side of the other of the two said laminar elements, said adhesive extending around the entire peripheral region of said other of said two laminar elements, then positioning the said two laminar elements in face to face relationship in direct alignment, with the face of the element bearing the information facing the face of the other element bearing the said adhesive, and securing said peripheral regions of said first and second laminar elements together by said adhesive by passing said facing laminar elements through combining rollers.

2. A method according to claim 1, characterised in that the step of providing adhesive to only the peripheral region of only one side of the other of the said two laminar elements is performed before provision of said secure information, and steps are taken to prevent adhesion of the said peripheral region to any other surface which may come into contact with the element until it is brought into contact with the co-operating face of the other said laminar element.

3. A method according to claim 1, wherein the step of securing said peripheral regions of said first and second laminar elements together by passing said facing laminar elements through combining rollers further comprises application, by the rollers, of bonding pressure.

4. The method according to claim 1, further comprising the step of radiating heat onto the two laminar elements prior to passing the laminar elements through the combining rollers.

* * * * *